(12) United States Patent
Sun et al.

(10) Patent No.: US 11,520,107 B2
(45) Date of Patent: Dec. 6, 2022

(54) POLARIZATION DIVERSITY GRATING COUPLERS WITH LOW LOSS AND ZERO PDW/PDL

(71) Applicant: HEWLETT PACKARD ENTERPRISE DEVELOPMENT LP, Houston, TX (US)

(72) Inventors: Peng Sun, Milpitas, CA (US); Thomas Van Vaerenbergh, Diegem (BE)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/235,830

(22) Filed: Apr. 20, 2021

(65) Prior Publication Data
US 2022/0334315 A1 Oct. 20, 2022

(51) Int. Cl.
*G02B 6/30* (2006.01)
*G02B 6/293* (2006.01)

(52) U.S. Cl.
CPC ........... *G02B 6/30* (2013.01); *G02B 6/29317* (2013.01); *G02B 6/29325* (2013.01); *G02B 6/29332* (2013.01)

(58) Field of Classification Search
CPC ............ G02B 6/29317; G02B 6/29323; G02B 6/29325; G02B 6/29332; G02B 6/30
See application file for complete search history.

(56) References Cited

U.S. PATENT DOCUMENTS

| 7,298,945 | B2 | 11/2007 | Gunn, III et al. | |
| 8,676,003 | B2 | 3/2014 | Roelkens et al. | |
| 9,091,827 | B2* | 7/2015 | Verslegers et al. | G02B 6/30 |
| 10,365,435 | B1* | 7/2019 | Karimelahi | G02B 6/124 |
| 10,712,513 | B2 | 7/2020 | Bruck et al. | |
| 2018/0306986 | A1* | 10/2018 | Bruck | G02B 6/136 |

FOREIGN PATENT DOCUMENTS

| CN | 207663088 U * | 7/2018 | ............ G02B 6/126 |
| WO | WO-2019097499 | 1/2020 | |

OTHER PUBLICATIONS

Caroll, L. et al., "Broad parameter optimization of polarization-diversity 2D grating couplers for silicon photonics", Optics Express, <https://www.osapublishing.org/oe/fulltext.cfm?uri=oe-21-18-21556&id=260981>, Sep. 6, 2013, 13 pgs., vol. 21, issue 18, Optical Society of America.

(Continued)

*Primary Examiner* — Daniel Petkovsek
(74) *Attorney, Agent, or Firm* — Sheppard Mullin Richter & Hampton LLP

(57) ABSTRACT

An optical grating coupler defining an axis and configured to couple light between a planar waveguide and an optical fiber, including first and second entry surfaces and a plurality of scattering regions symmetric to the axis and arranged such scattering strength presented to incoming light by the plurality of scattering regions changes from weak to strong along a beam path of the incoming light to match a Gaussian mode profile of the optical fiber.

20 Claims, 17 Drawing Sheets

(56) References Cited

OTHER PUBLICATIONS

Lalau-Keraly, M. C. et al., "Adjoint shape optimization applied to electromagnetic design", Optics Express, <https://www.osapublishing.org/oe/fulltext.cfm?uri=oe-21-18-21693&id=260994>, Sep. 6, 2013, 9 pgs., vol. 21, issue 18, Optical Society of America.
Su, L. et al., "Fully-automated optimization of grating couplers", <https://arxiv.org/pdf/1711.02228.pdf>, Nov. 7, 2017, 8 pgs.
Sun, P. et al., "Adjoint-method-inspired grating couplers for CWDM O-band applications", Optics Express, <https://www.osapublishing.org/oe/fulltext.cfm?uri=oe-28-3-3756&id=426337>, Jan. 27, 2020, pp. 3756-3767, vol. 28, issue 3, Optical Society of America.
Van Laere, F., et al., "Focusing polarization diversity gratings for Silicon-on-Insulator integrated circuits", Photonics in Tec, <http://photonics.intec.ugent.be/download/pub_2293.pdf>, Sep. 17-19, 2008, pp. 203-205, IEEE.
Verslegers et al., "Design of low-Loss Polarization Splitting Grating Couplers", Advanced Photonics for Communications, 2014, 3 pages.

\* cited by examiner

POLARIZATION DIVERSITY GRATING COUPLERS WITH LOW LOSS AND ZERO PDW/PDL

DESCRIPTION OF RELATED ART

As the demand for high-speed computing and communication becomes more prevalent, the use of optical systems as implemented by photonic circuits will continue to increase. The computational performance expectations demanded by the information technology industry is leading to an even greater demand for the use of photonic circuits. Accordingly, the transmission of optical signals can play an important role in the network infrastructure, in multiple applications in data centers and in numerous other applications. Optical signals can be transmitted along waveguides that guide the propagation of a signal within a photonic circuit. Coupling light between optical waveguides on silicon photonics devices and optical fibers is an important aspect of optical systems, allowing different systems to be integrated using the optical fibers. Polarization Diversity Grating Couplers (PDGC) are one type of coupler that can be used to couple light between the optical fibers and the waveguides on the photonic integrated circuits.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can be configured to provide a polarization diversity grating coupler architecture optimized to couple light between a planar waveguide and an optical fiber. Embodiments may include a coupler including a plurality of scattering regions symmetric to a coupler axis. Each of the scattering regions may include a plurality of scatterer structures dimensioned to provide scattering strengths and polarization dependent wavelengths tailored for each region. The regions may be configured in various embodiments such that placement of the grating regions is arranged so that light entering the grating coupler from the planar waveguide experiences an increasing scattering strength as it traverses the grating coupler from an entry surface and is coupled into the optical fiber. With an advanced numerical technique, referred to herein as an adjoint method, embodiments may be implement to create a new architecture of polarization diversity grating coupler, and quickly search through a large parameter space to determine an optimized design, which represents an improvement over conventional technology, which cannot search quickly through such large parameter spaces to achieve optimized design.

One example embodiment may include multiple scattering regions arranged symmetrically with respect to the coupler axis such that beam paths orthogonal to the entry surfaces include a first grating region including a first plurality of scatterer structures dimensioned to provide a first scattering strength and a negative polarization dependent wavelength (PDW); a second grating region adjacent the first grating section, including a second plurality of scatterer structures dimensioned to provide a second scattering strength stronger than the first scattering strength and a negative PDW; a third grating region adjacent the second grating section, including a third plurality of scatterer structures dimensioned to provide a third scattering strength stronger than the second scattering strength and a positive PDW; and a fourth grating region adjacent the third grating section, including a fourth plurality of scatterer structures dimensioned to provide a fourth scattering strength stronger than the third scattering strength and a positive PDW. Placement of these grating regions may be arranged such that light entering the grating coupler from the planar waveguide experiences and increasing scattering strength as it traverses the grating coupler and is coupled into the optical fiber. Embodiments may achieve low loss and close to zero polarization-dependent wavelength (PDW) and polarization-dependent loss (PDL).

Figure 1:
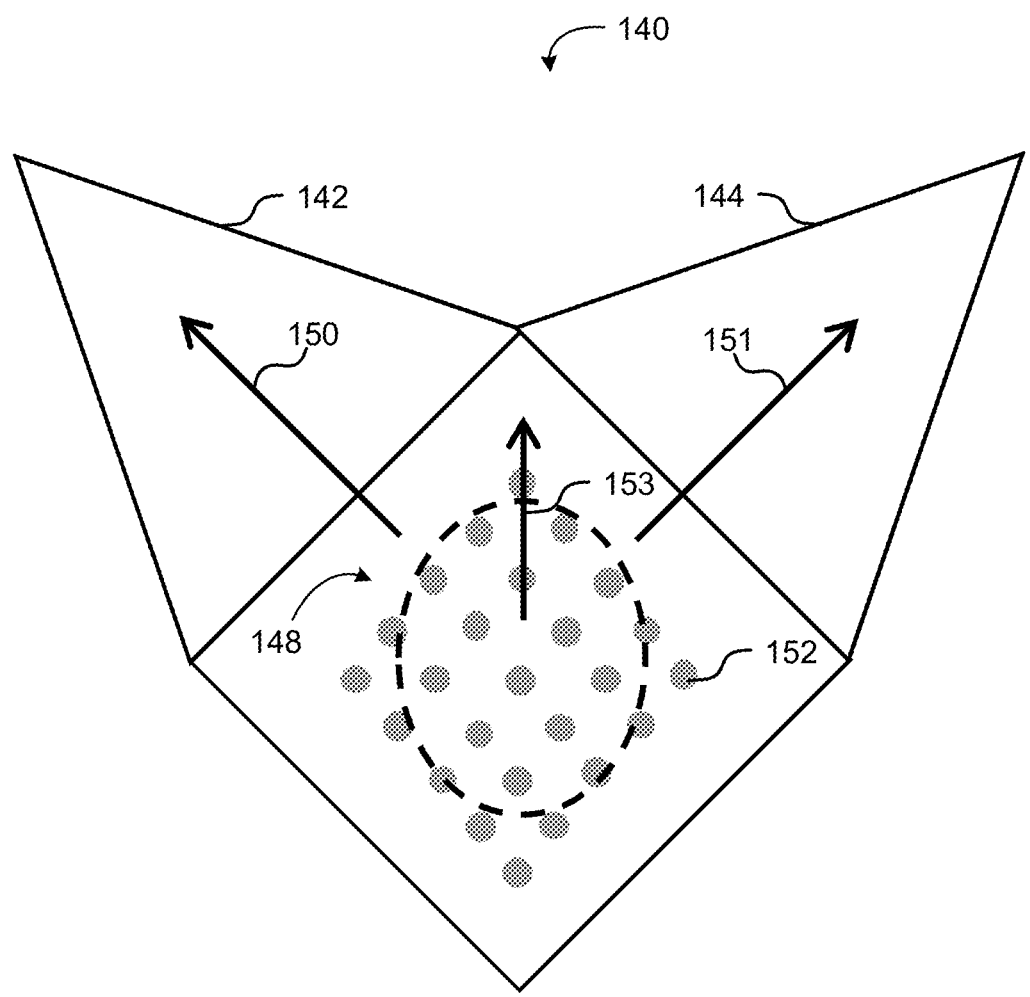
FIG. 1 illustrates an example of a general configuration of a polarization diversity grating coupler in accordance with various embodiments.

FIG. 1 illustrates an example of a general configuration of a polarization diversity grating coupler in accordance with various embodiments. This example polarization diversity grading coupler 140 includes a grating 148 with a plurality of scatters 152. Arrow 153 and the dashed oval represent the tilted optical fiber, in which arrow 153 is the projection of the tilted optical fiber. The polarization diversity grating coupler 140 diffraction light from an optical fiber into 2 waveguide arms, left waveguide arm 142 and right waveguide arm 144. This is represented by arrows 150, 151, respectively. Input light from the optical fiber has a random polarization state and light from the optical fiber is coupled into the left and right waveguides (via left with that arm 142 and right waveguide arm 144) differently, depending on the polarization state of the input light.

Figure 2:
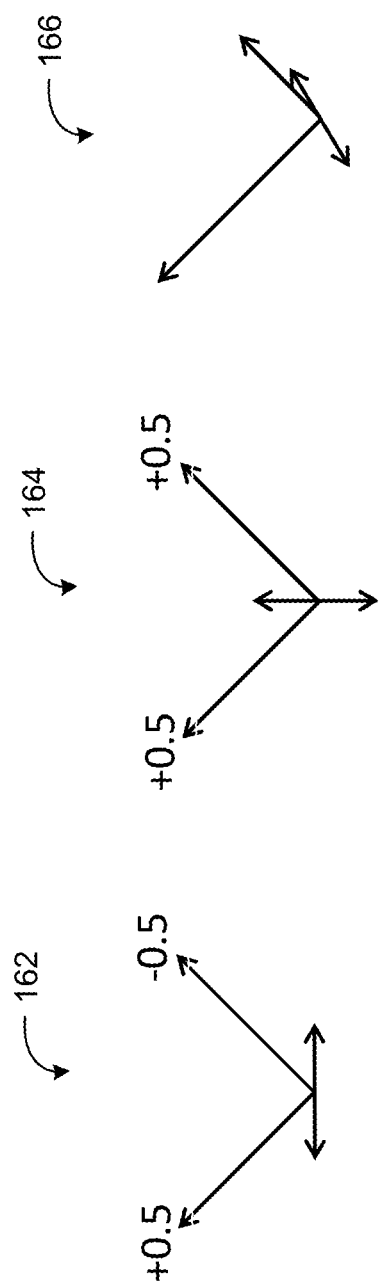
FIG. 2 illustrates examples of the various polarization states in the fiber in accordance with various embodiments.

FIG. 2 illustrates examples of the various polarization states in the fiber in accordance with various embodiments. Example 162 illustrates and example of senkrecht, or S-polarization, example 164 illustrates parallel, or p-polarization and example 166 illustrates arbitrary polarization. As noted above with reference to FIG. 1, the output of the grating coupler depends on the polarization status in the fiber. Various embodiments may be implemented with a goal to target as much light as possible from the fiber into the two waveguides with minimal impact of the polarization state in the fiber.

The example polarization diversity grating coupler 140 includes a 2-dimensional array of scatterers 152, which may be placed at the intersections of two sets of 1-dimensional lattices. Scatterers 152 may be implemented as 'holes' positioned in a grid designed to convert vertical light from the fiber into it in-plane light to be coupled into the waveguides. The middle lattice may not be perfectly in line because the fiber is not always perfectly perpendicular. However, the grating coupler should be able to couple light regardless of polarization.

Figure 3:
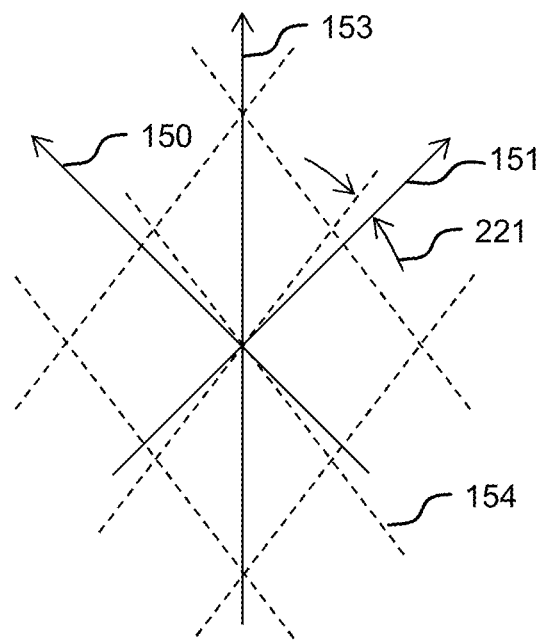
FIG. 3 illustrates an example of two sets of one-dimensional lattices in accordance with in accordance with various embodiments.
Figure 3:
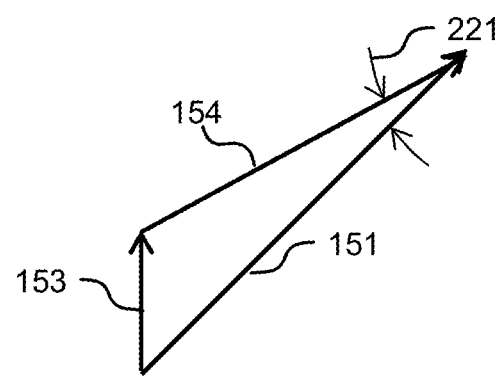

FIG. 3 illustrates an example of 2 sets of one-dimensional lattices 154 in accordance with in accordance with various embodiments. The scatterers 152 placed at these intersections may be designed to diffracted light of the optical fiber into one of 2 output waveguides, as illustrated by arrows 150 and 151. In this example, each of the 1D lattices is tilted with respect to the corresponding output waveguide, and the tilt angle 221 may be determined by the fiber tilt angle and the grating effective index.

Figure 4:
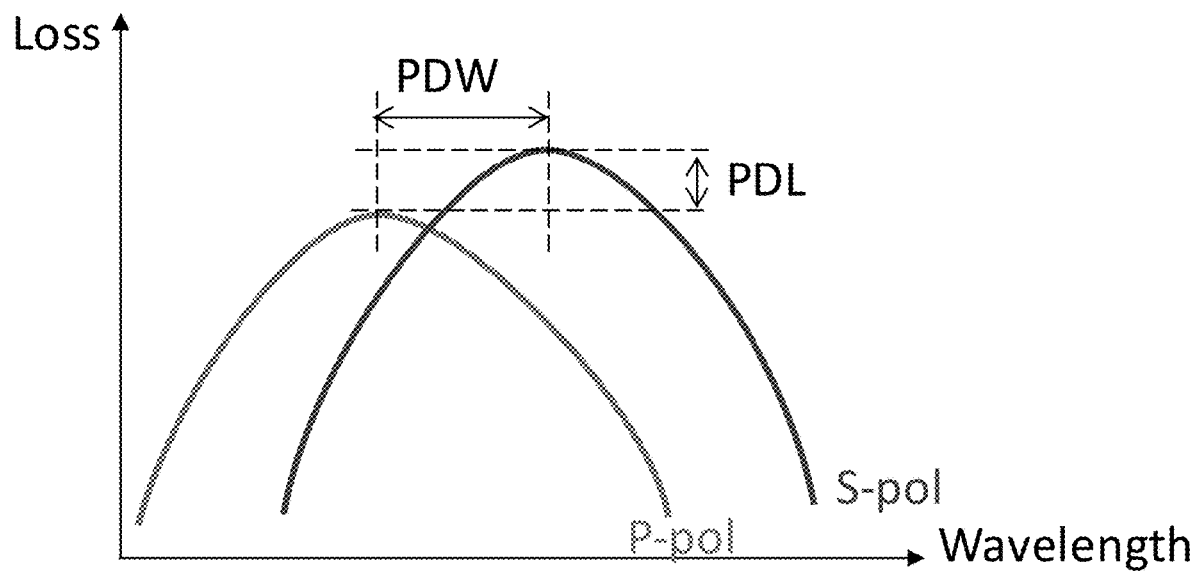
FIG. 4 illustrates an example of two coupling efficiency spectra at S-polarization and P-polarization.

The 2 polarization states, S and P, may be used to fully characterize a polarization diversity grating couplers. S-polarization and P-polarization light may have different polarization curves. FIG. 4 illustrates an example of 2 coupling efficiency spectra at S-polarization and P-polarization. In this example, the left-most curve illustrates P polarization and the right-most curve indicates as S-polarization. As this example illustrates, the peaks of the S-polarization and P-polarization curves are offset in x and y. Particularly, the peaks are offset by the polarization dependent wavelength (PDW) in the x direction and the polarization dependent loss (PDL) in the y direction. An ideal set up would decrease loss and reduce PDW and PDL to be zero.

Figure 5:
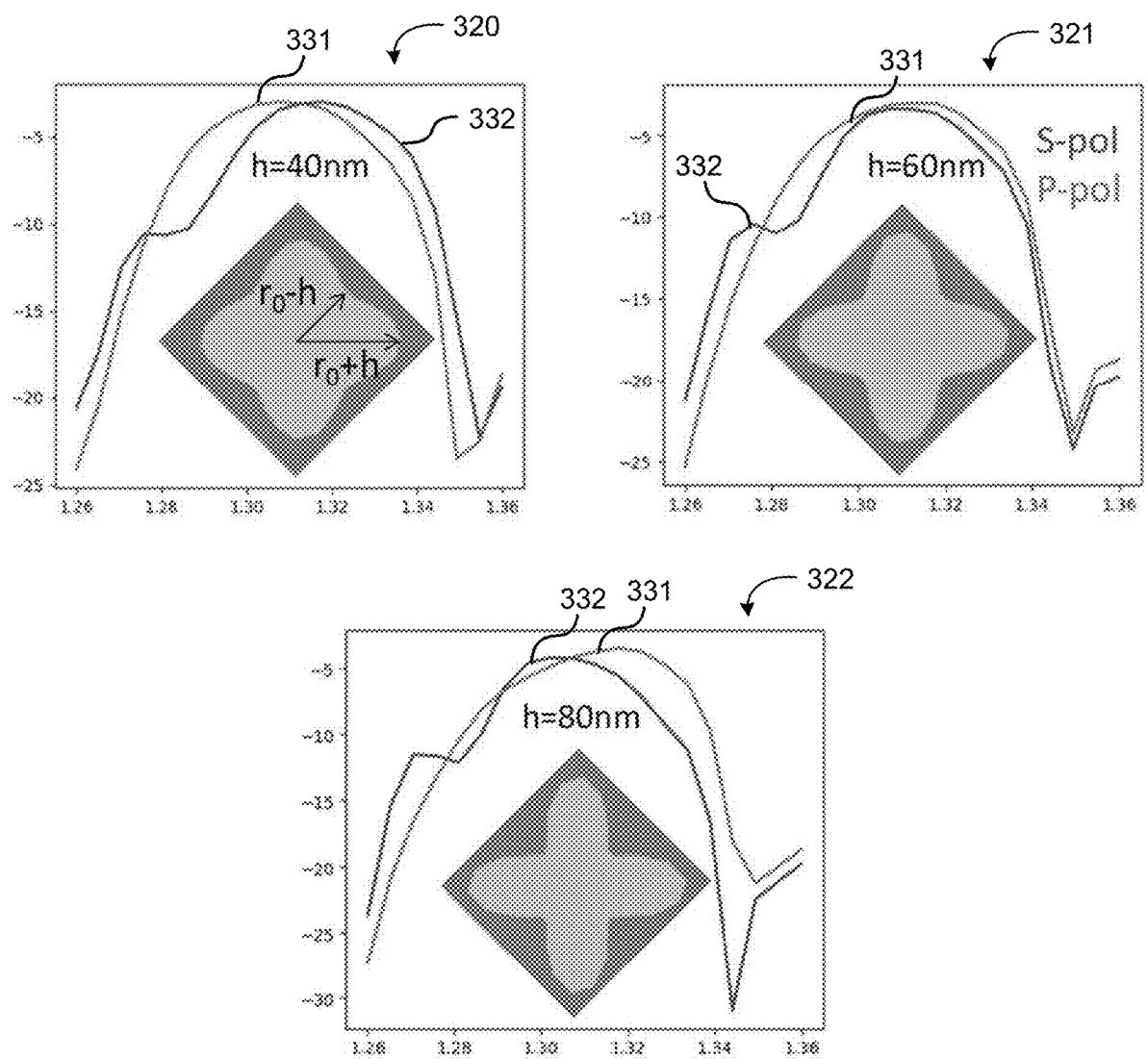
FIG. 5 illustrates example scatterer shape designs to reduce PDW and PDL in accordance with various embodiments.

FIG. 5 illustrates scatterer shape designs to reduce PDW and PDL in accordance with various embodiments. Tilting the fiber from perpendicular breaks the symmetry between the S and P polarization in the fiber, which gives rise to PDW and PDL. Embodiments may be configured with scatterers having dimensions stretched along the S or P polarization axis, or both, into a dendritic shape, while preserving fill factor. Such stretching can modulate the responses to S- and P-polarization, such that the PDW can be shifted, for example, from positive, to zero, to negative. The examples illustrated in FIG. 5 show the P-polarization loss curves 331 and S-polarization loss curves 332 for a rounded/squared cell 320, a somewhat dendritic cell 321, and a more dendritic cell 322. The cells in these examples are characterized by the radius of the cell (or altitude and diagonal in the case of a squared cell) $r_0$ adjusted by a factor h, as shown in cell 320. Cell 320 has an h of 40 nm; cell 321 has an h of 60 nm; and cell 322 has an h of 80 nm. In this example, the h value is the same for the diagonal of the cell as it is for the altitude of the cell, but in alternative embodiments the value can be different for the altitude and the diagonal.

Homogenous scatterers tend to result in exponentially decaying scattering strength, which does not match the optical fiber's Gaussian mode profile, which requires an increasing scattering strength. Embodiments modulate the scattering strength while preserving the fill factor by adjusting the aspect ratio. For example, embodiments may be implemented in which scatterers are compressed along one waveguide but stretched along the other waveguide. Weaker scattering in one direction and stronger scattering in the orthogonal direction, for example by stretching and compressing to change the aspect ratio with the same or similar area, scatters more light in one direction and less in another direction.

Figure 6:
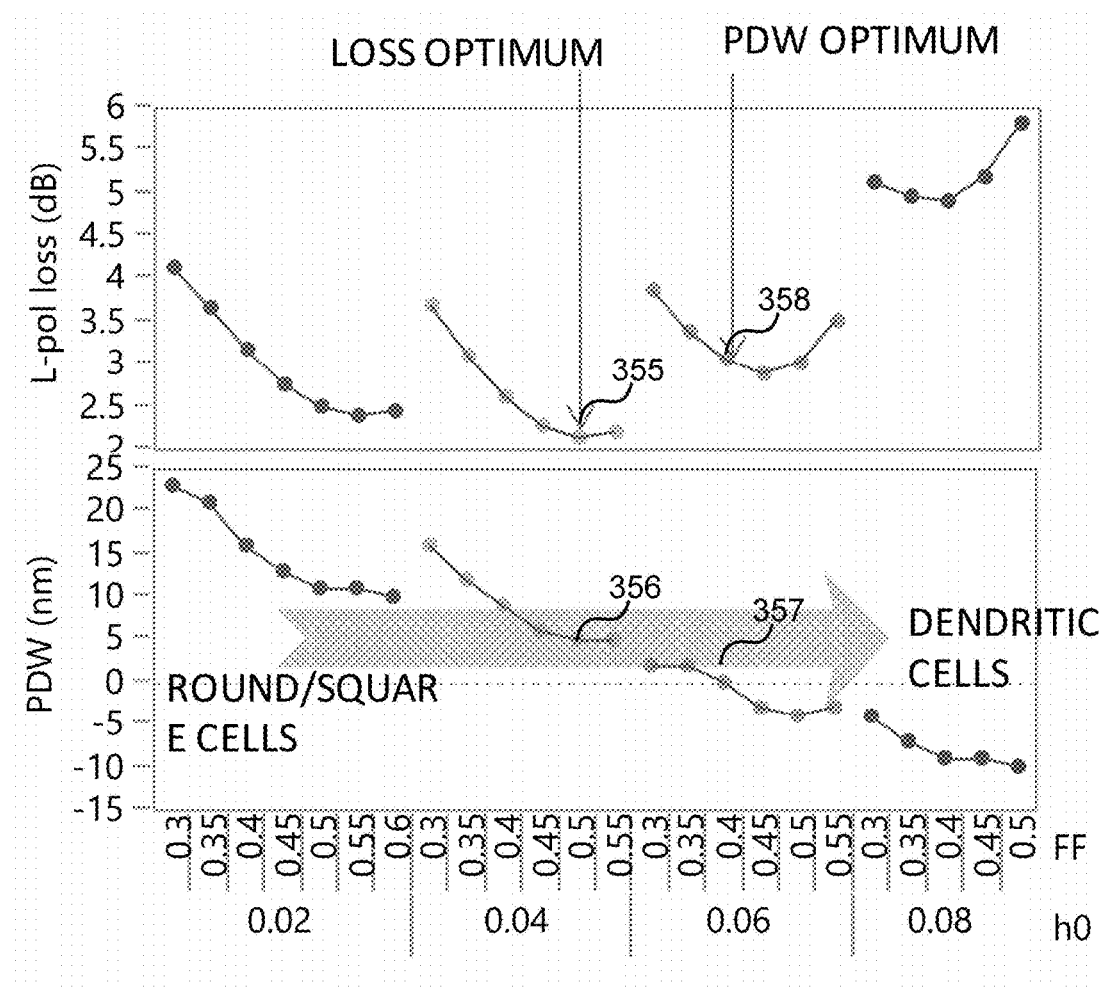
FIG. 6 is a plot illustrating an example of polarization loss (dB) and PDW (nanometers) as the shapes of the scatterers are adjusted from rounded/squared to dendritic.
Figure 7:
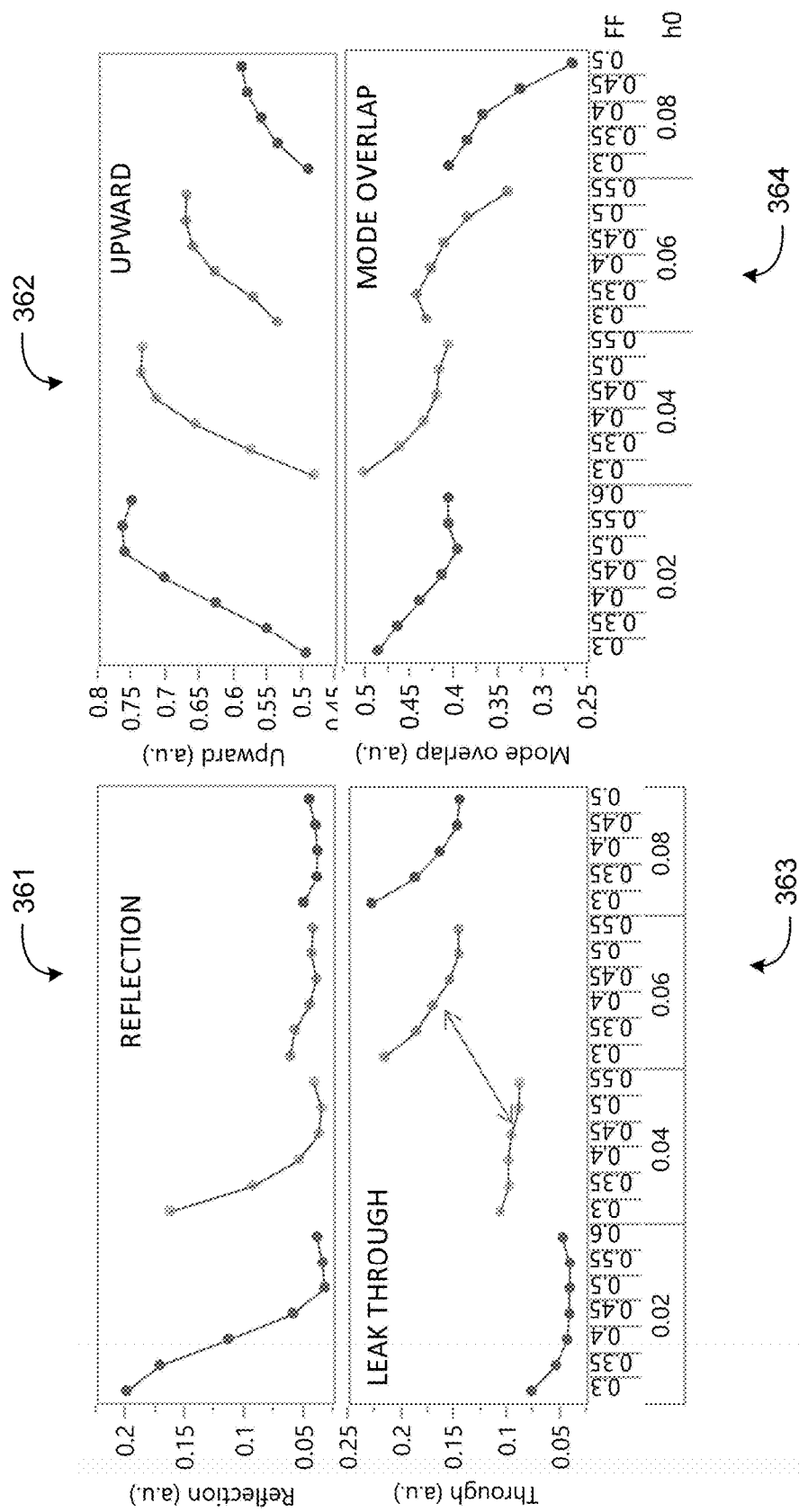
FIG. 7 illustrates the loss breakdown, showing example contributions of losses from reflection, upward losses, leak through losses and mode overlap losses for four cell types.

However, when combining scatterer shape and aspect ratio in an effort to achieve both low loss and low PDW and PDL, the Optima may not coincide. FIG. 6 is a plot illustrating an example of polarization loss (dB) and PDW (nanometers) as the shapes of the scatterers are adjusted from rounded/squared to dendritic. As this illustrates, the shape that yields an optimized loss 355 of close to zero has a higher PDW 356 of around 5 nm; whereas a shape that yields the lowest PDW 357 of near zero, yields a higher loss 358 of about 3.1 dB. as the scatterers are deformed into dendritic cells for low PDW/PDL, the scattering strength decreases, letting more power leak through the grating and increasing the loss. FIG. 7 illustrates the loss breakdown, showing the contributions of losses from reflection 361, upward losses 362, leak through losses 363 and mode overlap losses 364 for four cell types. In each case, these losses are shown with the value h increasing along the X axis for each cell from 0.3 nm to 0.6 nm. As these example charts illustrate, implementing a linear aspect ratio any homogenous scatterer shape may not be sufficient to achieve low loss while at the same time achieving low PDW/PDL. Accordingly, embodiments may be implemented with more sophisticated designs to achieve low loss and low PDW/PDL simultaneously.

Figure 8:
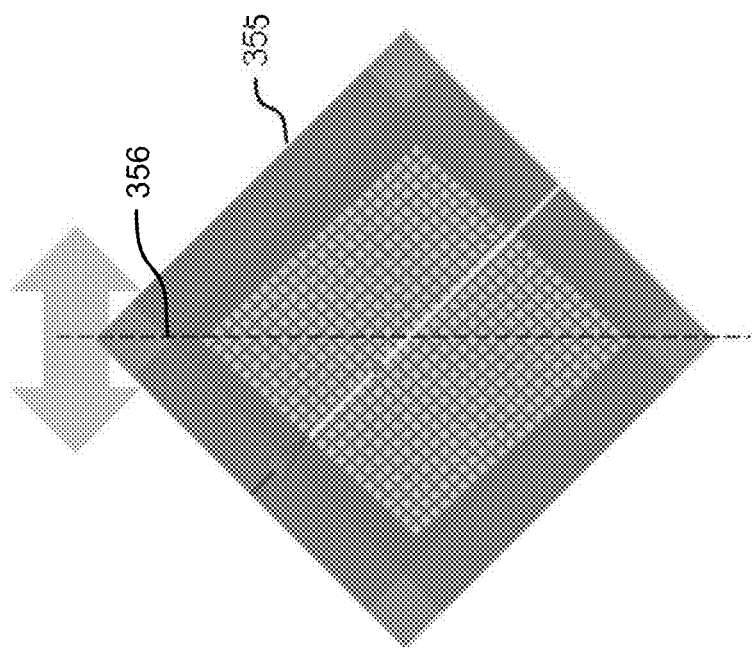
FIG. 8 illustrates an example configuration of a polarization diversity grating coupler in which the aspect ratio is synthesized on half of the grating, and mirror symmetry is enforced across the grating in accordance with various embodiments.

FIG. 8 illustrates an example configuration of a polarization diversity grating coupler in which the aspect ratio is synthesized on half of the grating, and mirror symmetry is enforced across the grating in accordance with various embodiments. In various embodiments, the grating coupler can be configured to have different shapes at different locations across the area of the coupler. For example, some areas of the coupler may be configured with shapes that are more rounded/squared and other areas configured with shapes that are more dendritic, while still other areas can be configured with shapes somewhat in between. In this example, grating coupler 355 has symmetry across the vertical axis 356. The different shapes on the left-hand side of vertical axis 356 may be arranged such that they are a mirror image of the shapes on the right-hand side of vertical axis 356.

Various embodiments may use scatterer shapes created using 2D Chebyshev polynomials to synthesize the Aspect Ratio profile. Particularly, a synthesizing system may specify a series of polynomials and generate a map, then use an array to specify the aspect ratio in the plane, wherein the 2D map is controlled with the array. One example may use a fifth order 2D Chebyshev polynomial (e.g., a 5×5 matrix) with 25 parameters to synthesize the aspect ratio profile polynomial coefficients to synthesize the aspect ratio, although other embodiments may use other polynomials.

Each scatterer shape may be synthesized by 6 sine and 6 cosine functions and across the grating area, the profile of various scatters is synthesized by fifth order 2D Chebyshev polynomials, for 300 parameters (e.g., 5×5×(6+6)). Other embodiments may use higher or lower order polynomials as well as polynomials other than Chebyshev polynomials.

Figure 9:
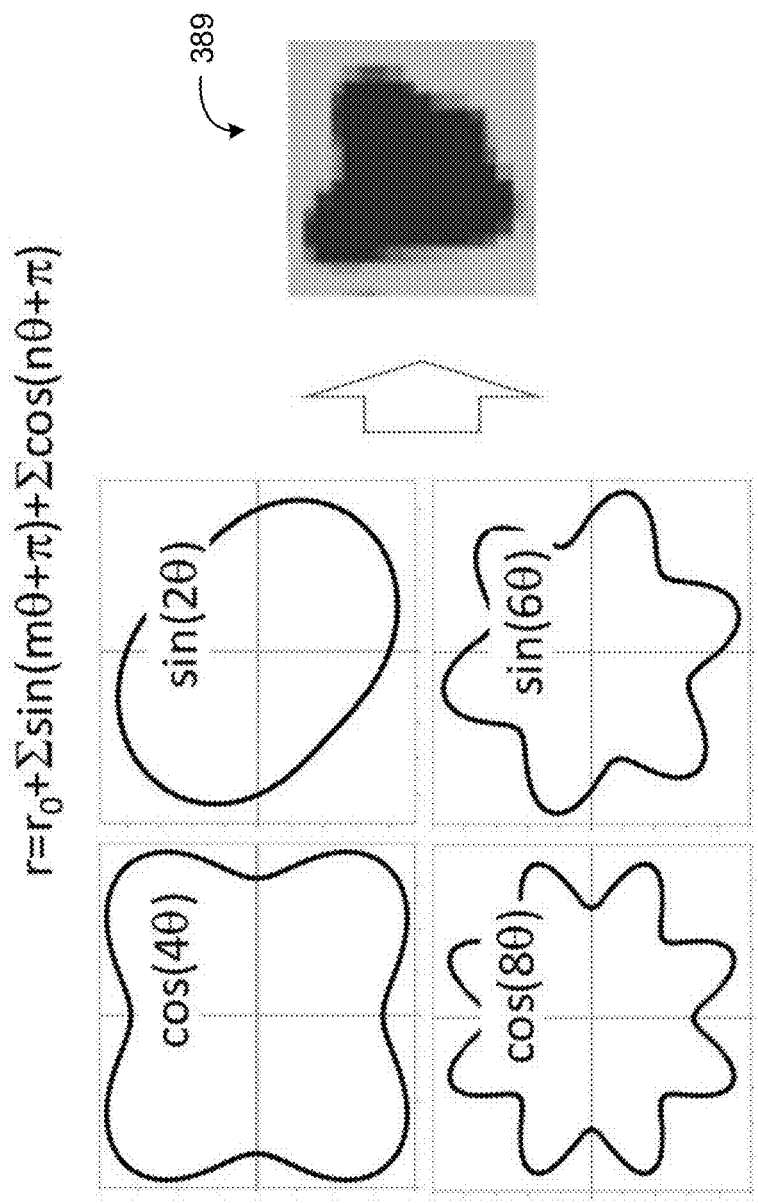
FIG. 9 illustrates an example of using such sine and cosine functions to synthesize a scatterer shape in accordance with various embodiments.

FIG. 9 illustrates an example of using such sine and cosine functions to synthesize a scatterer shape in accordance with various embodiments. In particular, the example in FIG. 9 uses radius and angle to synthesize the scatterer of desired size and shape. As noted above, embodiments may use This example illustrates an equation, set forth below, used to combine sine and cosine functions, as well as 2 sine and 2 cosine functions used to achieve the noted resultant scatterer 389.

$$r = r_0 + \Sigma \sin(m\theta + \pi) + \Sigma \cos(n\theta + \pi)$$

Regardless of the mechanism used to define the aspect ratio and shape of the scatterers, different scatterer shapes may be created and different shapes may be disposed at desired locations in the grating coupler structure. Accordingly, embodiments may be implemented to assign different scatterer shapes and aspect ratios to different locations or regions on the grating coupler, and the different scatterer shapes may be grouped together with other like scatterer shapes. Therefore, instead of just adjusting shape and aspect ratio, and using the resultant scatterer across the entire grating coupler, for example, embodiments may define regions of the grating coupler that each have a specified scatterer shape and aspect ratio that may be different from scatterer shapes and aspect ratios found in other regions of the grating coupler.

Figure 10:
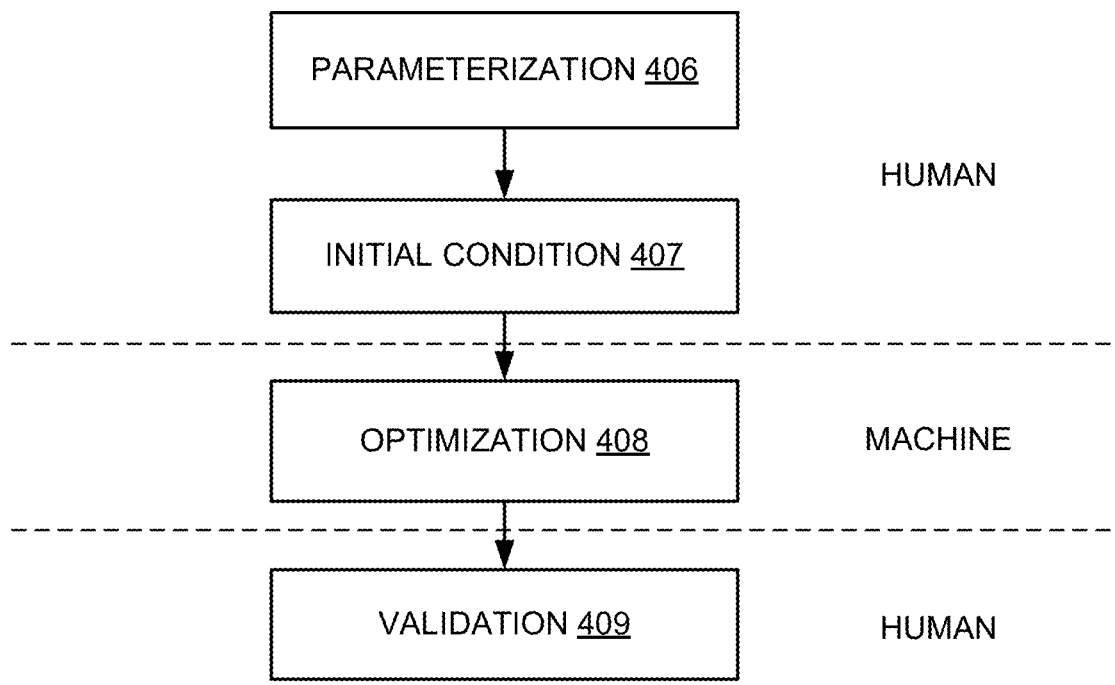
FIG. 10 illustrates an example process for adjoint optimization, including human and machine steps, in accordance with various embodiments.

FIG. 10 illustrates an example process for adjoint optimization, including human and machine steps, in accordance with various embodiments. Due to the complexity of the optimization process and the number of possibilities examined to achieve optimization, it is not possible that the optimization process be performed in the human mind. Accordingly, processor-based computations are performed for the optimization process. In various embodiments, a combination of human steps for parameterization and setting initial conditions can precede the processor-based optimization process, and human interaction may also be used for validation of the resultant design. FIG. 10 illustrates an example of this hybrid process. At operations 406 and 407, a human operator identifies an initial-estimation set of parameters to provide an initial array as a starting point for the optimization process. Design parameters may include, for example, shapes, aspect ratios of the shapes and locations on the grating coupler for each of the shapes.

At operation 408, a processor-based system performs the optimization in an iterative manner such as, for example, by beginning from the initial design and updating the design to improve performance. Once the processor-based system has completed the optimization, the human operator can validate the performance at operation 409. The process can be run for different wavelengths and the appropriate figures of merit and gradient can be calculated at each wavelength. In various embodiments, the system may be configured to determine the final solution based on the figures of merit at the plurality of wavelengths or this can be left to the human designer. For example, the system may be configured to select an optimum solution based on an average of the figures of merit received for each wavelength.

Figure 11:
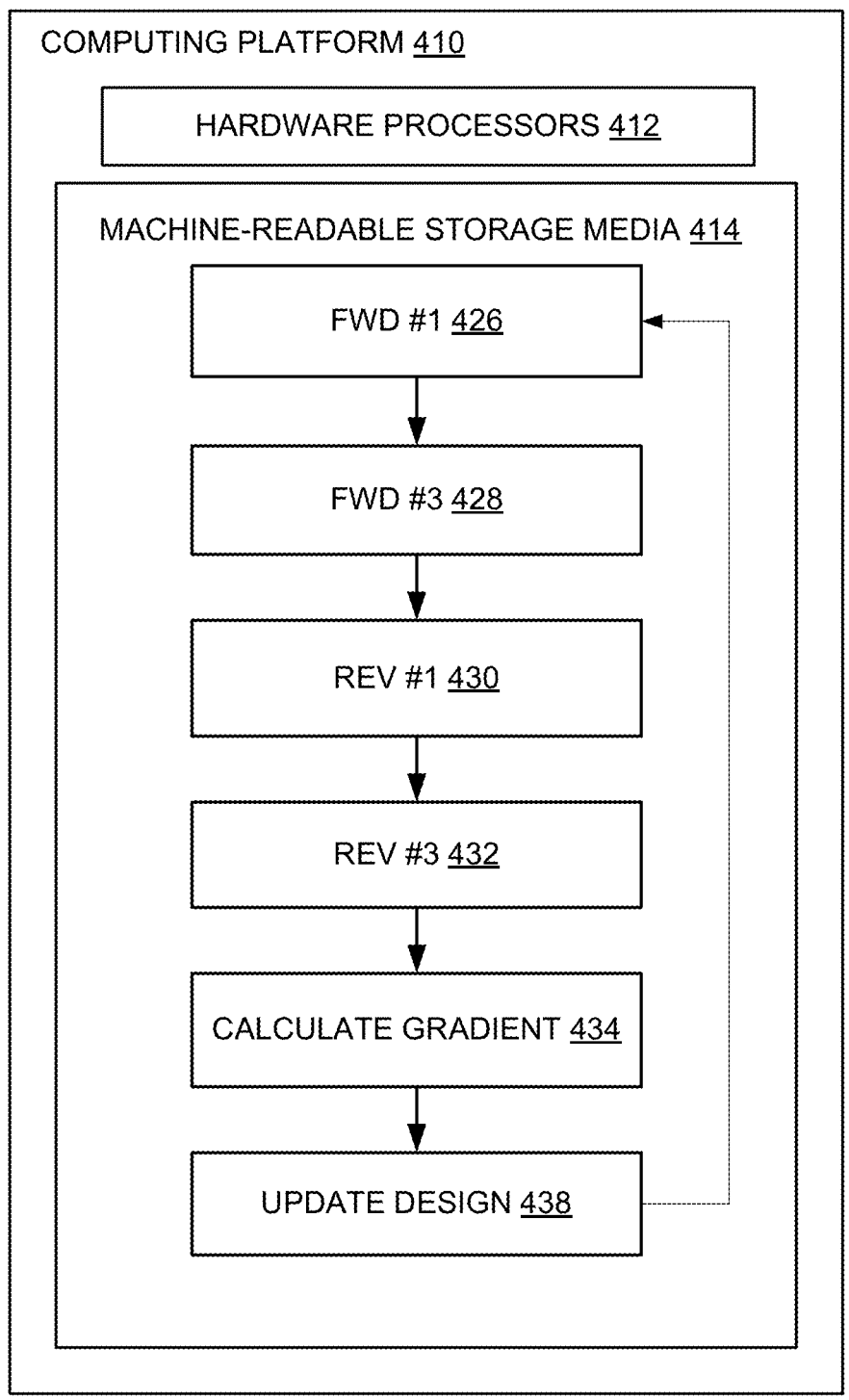
FIG. 11 illustrates an example computing component that may be used to implement design optimization in accordance with various embodiments.

FIG. 11 illustrates an example computing component that may be used to implement design optimization in accordance with various embodiments. Referring now to FIG. 11, computing component 410 may be, for example, a server computer, a controller, or any other similar computing component capable of processing data. In the example implementation of FIG. 11, the computing component 410 includes a hardware processor 412, and machine-readable storage medium 414.

Hardware processor 412 may be one or more central processing units (CPUs), semiconductor-based microprocessors, and/or other hardware devices suitable for retrieval and execution of instructions stored in machine-readable storage medium 414. Hardware processor 412 may fetch, decode, and execute instructions, such as instructions 426-438, to control processes or operations for burst preloading for available bandwidth estimation. As an alternative or in addition to retrieving and executing instructions, hardware processor 412 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 314, may be any electronic, magnetic, optical, or other physical storage device that contains or stores executable instructions. Thus, machine-readable storage medium 413 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 413 may be a non-transitory storage medium, where the term "non-transitory" does not encompass transitory propagating signals. As described in detail below, machine-readable storage medium 413 may be encoded with executable instructions, for example, instructions 426-438.

Hardware processor 412 may execute instructions 426 to 428 to evaluate the performance of the initial design first in a forward mode and then in a reverse mode. For example, the system may be configured to run a Maxwell's Equations solver to arrive at a performance estimate for the initial design. Forward and reverse processes 1, 2 and 3 are for processing at three different wavelengths. Other embodiments may be configured to perform the analysis with greater than or fewer than three wavelengths. The system can be configured to calculate a figure of merit for each wavelength as well as a gradient (below at instruction 434) for each wavelength. Hardware processor 412 may execute instructions 430 to 432 to run a second evaluation based on the adjoint method.

Figure 12:
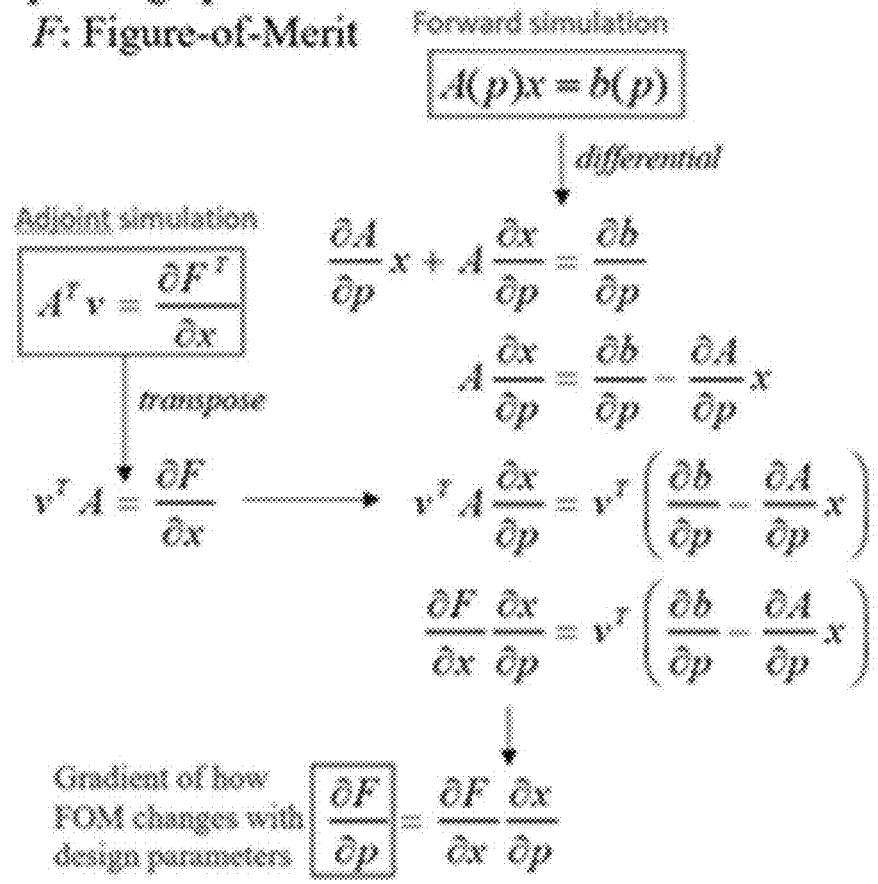
FIG. 12 illustrates an example application of Maxwell's Equations for a forward simulation and an adjoint simulation in accordance with various embodiments.

Both forward and reverse simulations in various embodiments may be implemented as procedures to solve Maxwell's electromagnetic (EM) equations. In forward simulations, electromagnetic fields excited by the source propagates to a monitor within the system and are recorded for analysis. Then in reverse simulations, based on results of the forward simulations, the monitor in forward simulations is used as the new source to excite electromagnetic fields. The system then calculates the gradient of the figure of merit with respect to the current design parameters, an example of which is described below with reference to operation 434. In other words, the system can determine how sensitive it is based on its effect on the figure of merit, for example, by perturbing any or all of the design parameters. This is possible because the Maxwell's equations are a linear system, and embodiments may be configured to take advantage of the so called duality in linear systems. FIG. 12 illustrates an example application of Maxwell's Equations for a forward simulation and an adjoint simulation in accordance with various embodiments.

Hardware processor 412 may execute instruction 434 to calculate the gradient. The gradient may include, for example, an indication of which direction to move the aspect ratio or the position of the configured shapes to achieve the most gain (lowest loss) or decrease the PDW or PDL. In operations 426 to 434, the system may be configured to simulate the response and predict whether an increase or decrease in the aspect ratio, or other changes to the shape (e.g., making the shape rounder/more square, or more dendritic) will yield the desired results. An example gradient of how the figure of merit changes with, or is affected by, the design parameters is shown in FIG. 12.

Hardware processor 412 may execute instruction 438 to revise the design in accordance with the gradient calculated at instruction 434. In various embodiments, the system may apply newly calculated parameters in accordance with the gradient to achieve the updated design. The gradient may inform the system where and how to change the design parameters. Because of their various positions in the coupler, scatterers at different locations may respond differently, or they may be assigned different objectives. For example, in some regions it may be desirable to have scatterers with very weak scattering and a negative PDW, while in other regions it might be desirable to have very strong scattering and a positive PDW, while in yet other regions it may be desirable to have yet other characteristics of scattering and PDW.

Hardware processor 412 may execute instructions 426 to 438 iteratively until the updated design is optimized. The iteration may continue until the desired figure of merit is reached or until a maximum number of iterations is reached. As noted above, the system may be configured to determine the final solution based on figures of merit calculated at a plurality of wavelengths or this can be left to the human designer. For example, the system may be configured to select an optimum solution based on an average of the figures of merit received for each wavelength. The design at various iterations and at the final iteration may be adjusted to ensure manufacturing specifications are met such as, for example, minimum feature sizes that may be constrained based on the fabrication process or foundry requirements.

Figure 13:
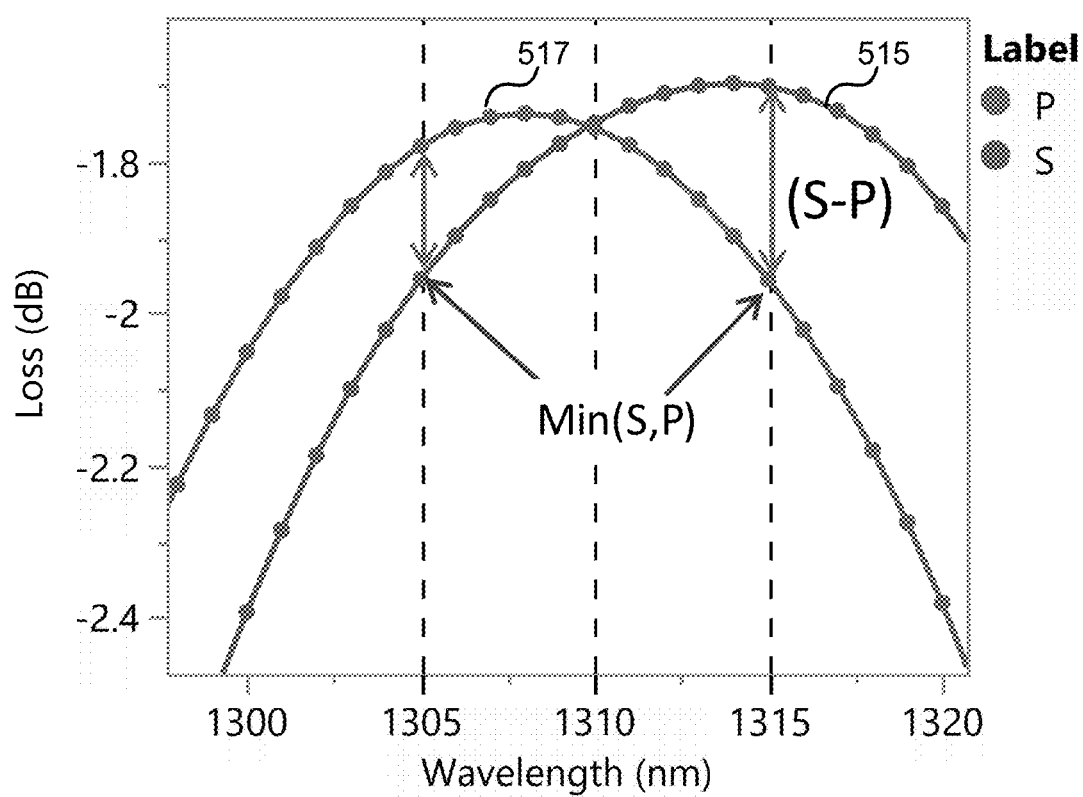
FIG. 13 illustrates example P-polarization and S-polarization loss curves.

Ideally, the figure of merit should evaluate the extent to which the PDW and PDL are minimized over a wavelength range. FIG. 13 illustrates example P-polarization and S-polarization loss curves. In optimum solution may be, for example, where the curves are as high as possible (maximum gain or minimum peak loss) and overlap as much as possible (small PDW and PDL). In various embodiments, the figure of merit can be defined as:

$$FOM = (\min(S,P) - c^*(S-P)^2 \text{ at } 1305 \text{ nm}) + (\min(S,P) - c^*(S-P)^2 \text{ at } 1310 \text{ nm}) + (\min(S,P) - c^*(S-P)^2 \text{ at } 1315 \text{ nm})$$

Where the minimums (min) are specified at a given wavelength (in this example, 1305 nm, 1310 nm and 1315 nm) as the difference in loss between the S polarization and the people there is a curve. C is an arbitrary number that can be used as a weighting factor, for example, to weight the wavelengths according to importance. In other embodiments, other figures of merit can be specified.

In this example, the figure of merit is evaluated to minimize loss, minimize PDW and minimize PDL. This example evaluates the figure of merit at three different wavelengths, which may correspond to Forward and Reverse steps 1, 2 and 3 in FIG. 11. Also, in addition to c, weighting factors could be assigned to each wavelength overall as illustrated by the addition of weighting factors X, Y and Z as:

$$FOM = X^*(\min(S,P) - c^*(S-P)^2 \text{ at } 1305 \text{ nm}) + Y^*(\min(S,P) - c^*(S-P)^2 \text{ at } 1310 \text{ nm}) + Z^*(\min(S,P) - c^*(S-P)^2 \text{ at } 1315 \text{ nm})$$

Figure 14:
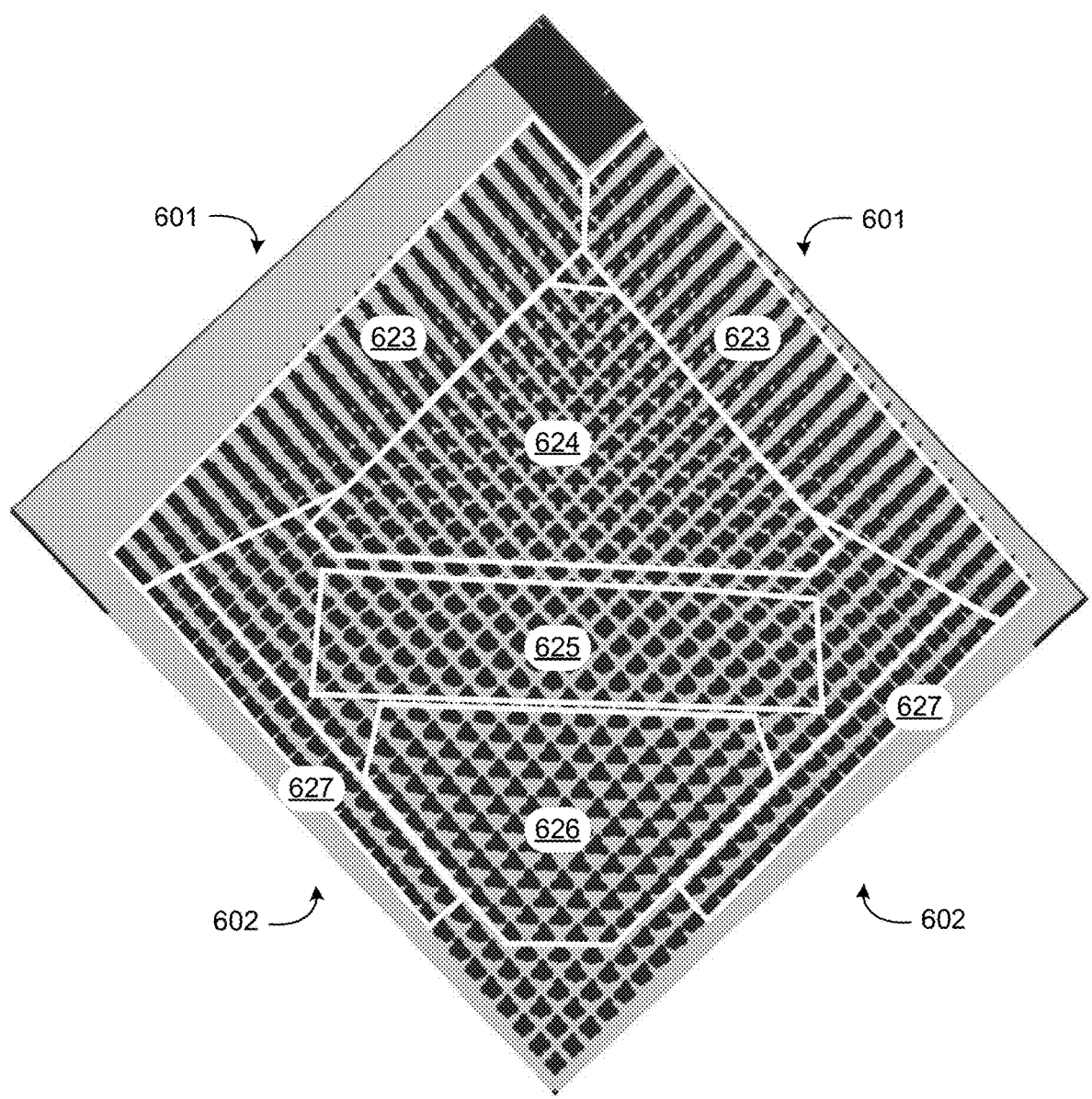
FIG. 14 illustrates an example arrangement of a polarization diversity grating coupler in accordance with various embodiments.
Figure 15:
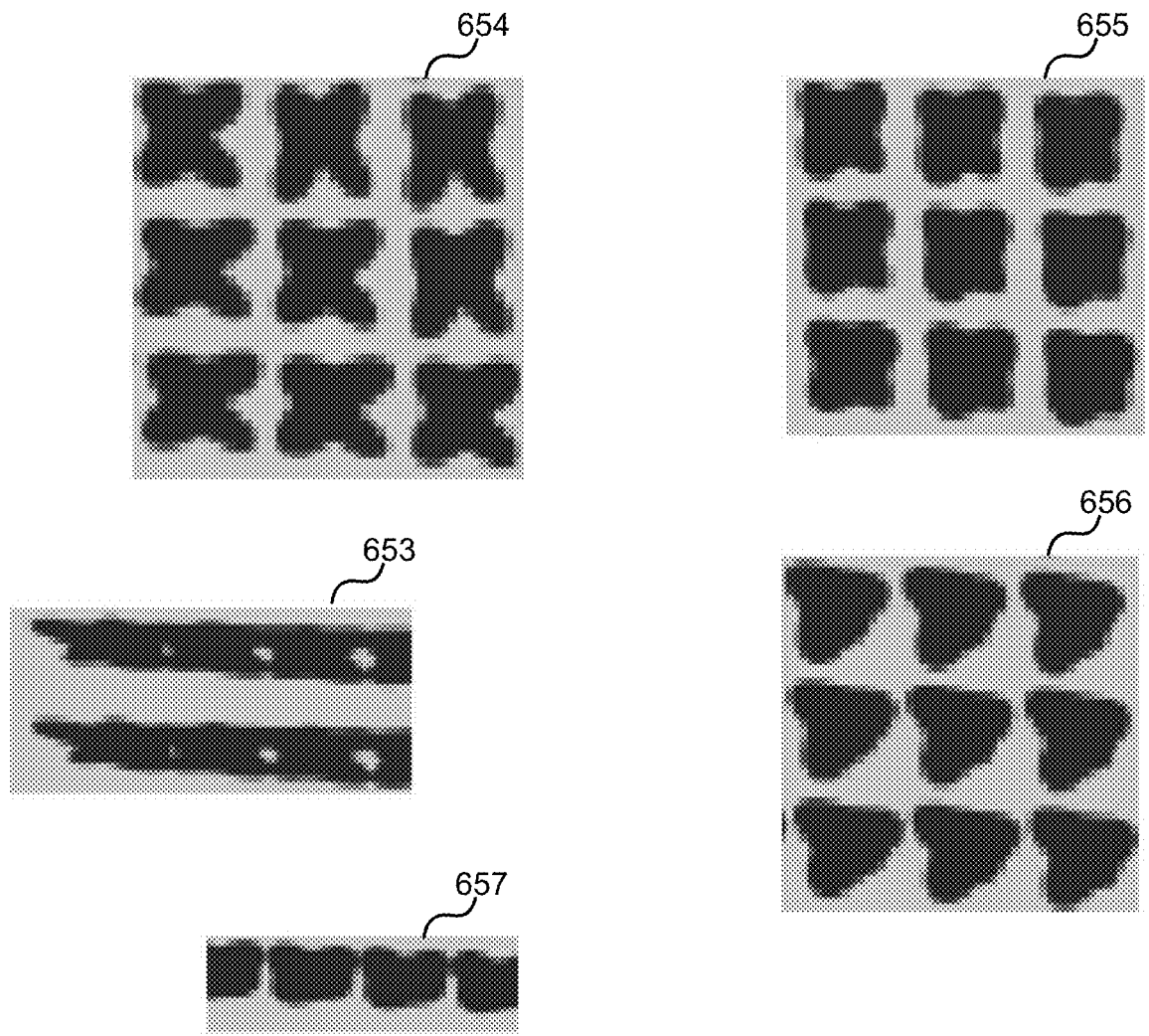
FIG. 15 illustrates example scatterer shapes that can be included in the various regions in FIG. 15.
Figure 16:
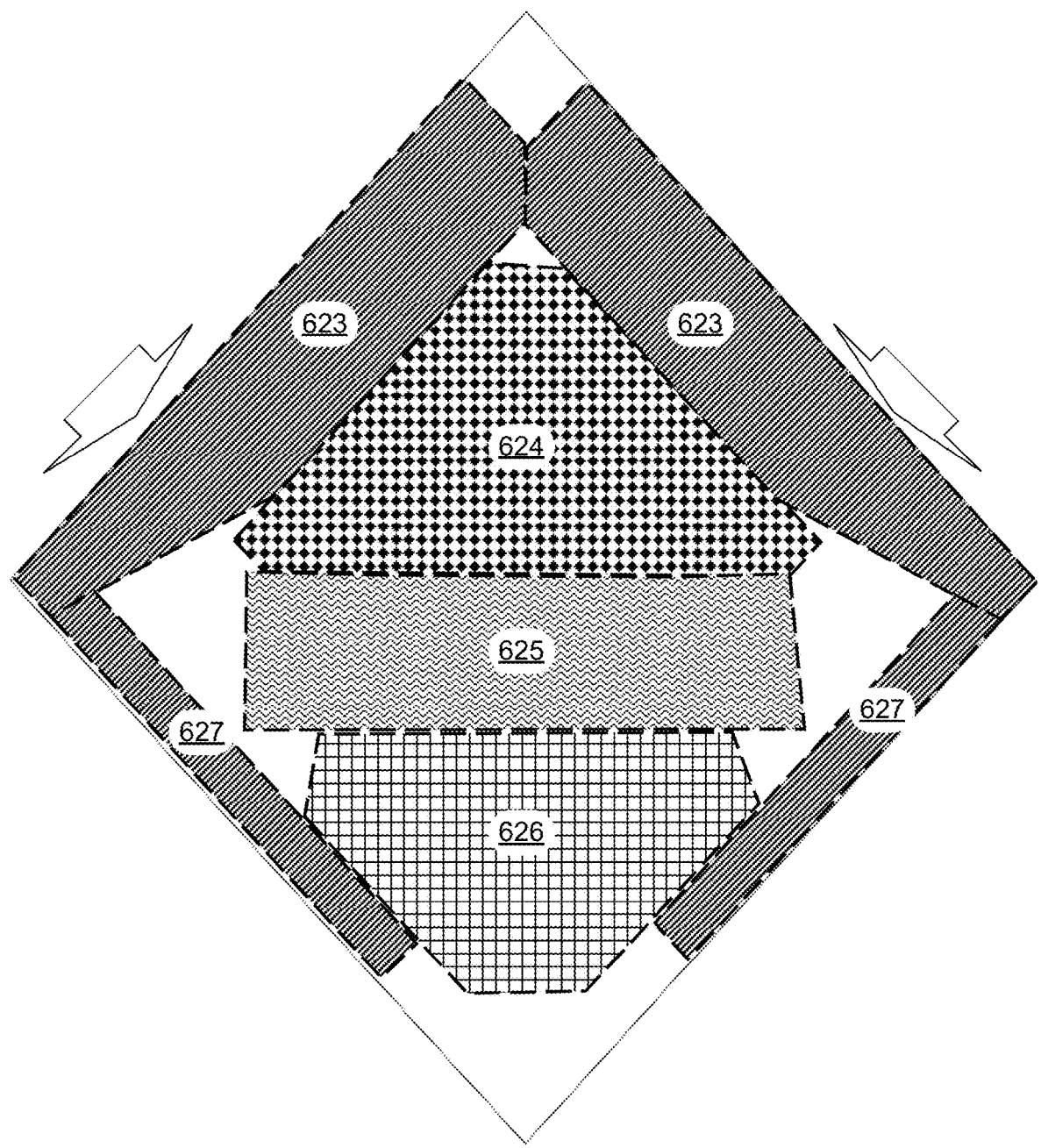
FIG. 16 illustrates the regions in the example coupler depicted in FIG. 14.

FIG. 14 illustrates an example arrangement of a polarization diversity grating coupler in accordance with various embodiments. This example includes at least seven regions of scatterers to achieve desired results. FIG. 15 illustrates example scatterers shapes that can be included in the various regions in FIG. 15. FIG. 16 illustrates the regions in the example coupler of FIG. 14. Referring now to FIGS. 13, 14 and 15, the shape and aspect ratio of the scatterers can be configured to transition (in some cases continuously) within a region from one edge of the region to the next. This transition of shape and aspect ratio can be implemented to modulate scattering strength and PDW of the scatterers within a given region.

The example in FIG. 14 includes regions 623, 624, 625, 626 and 627. Examples of the corresponding shapes in these regions (which may vary within a region) are illustrated in FIG. 15, as shapes 653, 654, 655, 656 and 657, respectively. Shapes 653 in both regions 623 are stretched, wide aspect ratio shapes (that are stretched to the point of touching adjacent scatterers) in the head regions, or entry edge regions (near entry edges 601, or proximal edges), of the coupler adjacent the waveguide interfaces. These have very weak scattering and a negative PDW and are configured to provide good coupling between the polarization diversity grating coupler in the waveguide. So as light comes from the waveguides, very little of it is scattered outside of the plane of the grating coupler by regions 623 and the light is allowed to continue along the beam paths from the proximal edges of regions 623 to the distal edges of regions 623 into the other regions of the grating coupler.

Region 624 includes shapes 654, which are dendritic and have weak scattering and also have a negative PDW. Region 625 includes shapes 655 which are relatively square cells as compared to the other regions with strong scattering and a positive PDW. Note that the PDW changes from negative in region 624 to positive in region 625. Region 626 in this example includes triangular or boomerang shaped cells with very strong scattering and a positive PDW. Strong scattering in region 625 and very strong scattering this region 626 causes light to scatter outside of the plane of the grating coupler into the optical fiber. Regions 627, located in distal regions near distal edges 602 of the grating coupler, also include merge cells, but with very strong scattering and a negative PDW. The purpose of this region is to cause light to scatter outside of the plane and block light from exiting the distal edges 602 of the grating coupler. As can be seen in the illustration, the orientation of the stretched shapes is parallel to the distal edges 602 in region 627 as opposed to orthogonal to the edge as it is in region 623. Having weak scattering at the outer edges and stronger scattering away from the edges provides good coupling to the Gaussian mode optical fiber.

As described above, the different regions within the coupler can have different PDW values. However, in some embodiments, the overall PDW value of the grating coupler is zero. With this extra degree of freedom, the coupler can be designed to achieve different goals. As can be seen in the example of FIGS. 14 and 15, this polarization diversity grating coupler has bilateral symmetry.

As this example illustrates, a polarization diversity grating coupler can be configured with several regions having different shaped scatterers with different characteristics in the different regions. The regions need not be configured as illustrated in this example, but can be varied depending on the application. Additionally, in various embodiments, the shapes of the scatterers within one or more of the regions can vary (e.g., from one edge of the region to another).

In the illustrated example, because the shapes change continuously and smoothly within their regions, and because of the way the regions are laid out, the scattering strength for incoming light from the left or right waveguide changes continuously and smoothly from weak to strong to match the Gaussian profile of the fiber. Also in this example, the PDW changes continuously and smoothly from negative to positive such that the overall PDW is zero.

The scattering strength in various embodiments always increases monotonically from the proximal edge (closer to waveguide) to distal edge (farther from waveguide) to match the Gaussian mode of the fiber. However, embodiments may be implemented in which the sign and amplitude of the PDW in each region may not necessarily be the same as described in examples provided above. For example, the PDW can be negative-positive-negative-positive, and the values are preferably chose such that the overall PDW is zero.

This example illustrates using scatterers to modulate the scattering strength by changing both the scatterers shape and the scatter aspect ratio. Embodiments may use 2D ortho normal basis functions to synthesize arbitrary profiles of the aspect ratios for the optimization process. 1D ortho normal basis functions may be used to synthesize the arbitrary scatterers shapes for optimization.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 17:
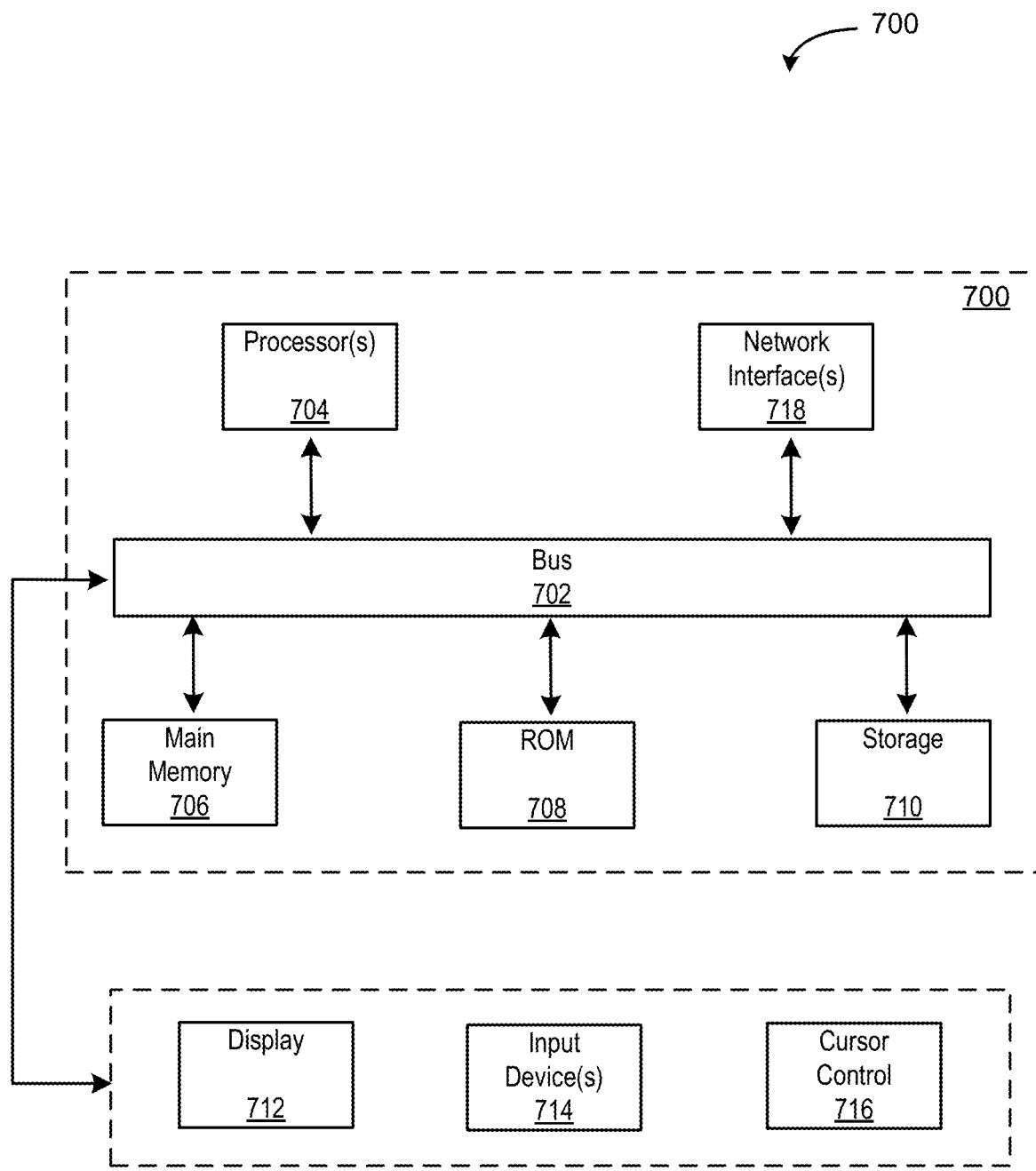
FIG. 17 is an example computing component that may be used to implement various features of embodiments described in the present disclosure.

FIG. 17 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical grating coupler defining an axis and configured to couple light between a planar waveguide and an optical fiber, comprising:
    first and second entry surfaces; and
    a plurality of scattering regions symmetric to the axis and arranged along beam paths orthogonal to the entry surfaces, the scattering regions comprising:
        a pair of first scattering regions, the first scattering regions occupying respective entry edge regions of the grating coupler, the pair of first scattering regions comprising a first plurality of scatterer structures dimensioned to provide a first scattering strength and a negative polarization dependent wavelength (PDW);
        a second scattering region adjacent respective edges of the pair of first scattering regions, comprising a second plurality of scatterer structures dimensioned to provide a second scattering strength stronger than the first scattering strength and a negative PDW;
        a third scattering region adjacent the second scattering region, comprising a third plurality of scatterer structures dimensioned to provide a third scattering strength stronger than the second scattering strength and a positive PDW; and
        a fourth scattering region adjacent the third scattering region, comprising a fourth plurality of scatterer structures dimensioned to provide a fourth scattering strength stronger than the third scattering strength and a positive PDW;
        wherein placement of the scattering regions is arranged such that light entering the grating coupler from the planar waveguide experiences an increasing scattering strength as it traverses the grating coupler and is coupled into the optical fiber.

2. The optical grating coupler of claim 1, wherein a scattering region of the plurality of scattering regions comprises a plurality of scatterer structures that vary in aspect ratio continuously from a proximal edge to a distal edge of the scattering region.

3. The optical grating coupler of claim 1, further comprising a pair of fifth scattering regions occupying respective distal edge regions of the grating coupler, the pair of fifth scattering regions comprising a fifth plurality of scatterer structures dimensioned to provide a fifth scattering strength stronger than the third scattering strength and a positive PDW.

4. The optical grating coupler of claim 1, wherein scattering strength presented to incoming light by the plurality of scattering regions changes from weak to strong along a beam path of the incoming light to match a Gaussian mode profile of the optical fiber.

5. The optical grating coupler of claim 1, wherein the PDW of the plurality of scattering regions changes from negative to positive along a beam path of the incoming light.

6. The optical grating coupler of claim 5, wherein the overall PDW of the optical grating coupler is zero.

7. The optical grating coupler of claim 1, wherein shapes and aspect ratios of the scatterer structures are selected to modulate scattering along the beam path to match a gaussian mode of the fiber and reduce loss.

8. The optical grating coupler of claim 1, wherein the first plurality of scatterer structures in the pair of first scattering regions are configured as merged scatterer cells presenting an elongate structure parallel to the beam path.

9. The optical grating coupler of claim 1, wherein the second plurality of scatterer structures comprises dendritic cells.

10. The optical grating coupler of claim 1, wherein the third plurality of scatterer structures comprises square cells.

11. The optical grating coupler of claim 1, wherein the fourth plurality of scatterer structures comprises triangular cells.

12. The optical grating coupler of claim 1, wherein scatterer structures in a scattering region of the plurality of scattering regions vary in shape continuously from a proximal edge to a distal edge of the scattering region.

13. The optical grating coupler of claim 1, wherein an aspect ratio of the scatterer structures in a scattering region of the plurality of scattering regions varies continuously from a proximal edge to a distal edge of the scattering region.

14. The optical grating coupler of claim 1, wherein the PDW of the scattering regions of the grating coupler are configured such that the PDW of the grating coupler is zero.

15. A method of fabricating an optical grating coupler to couple light between a planar waveguide and an optical fiber, the method comprising:
    forming a pair of first scattering regions, the first scattering regions occupying respective entry edge regions of the grating coupler, the pair of first scattering regions comprising a first plurality of scatterer structures dimensioned to provide a first scattering strength and a negative polarization dependent wavelength (PDW);
    forming a second scattering region adjacent respective edges of the pair of first scattering regions, comprising a second plurality of scatterer structures dimensioned to provide a second scattering strength stronger than the first scattering strength and a negative PDW;
    forming a third scattering region adjacent the second scattering region, comprising a third plurality of scatterer structures dimensioned to provide a third scattering strength stronger than the second scattering strength and a positive PDW; and
    forming a fourth scattering region adjacent the third scattering region, comprising a fourth plurality of scatterer structures dimensioned to provide a fourth scattering strength stronger than the third scattering strength and a positive PDW;
    wherein placement of the scattering regions is arranged such that light entering the grating coupler from the planar waveguide experiences an increasing scattering strength as it traverses the grating coupler and is coupled into the optical fiber.

16. The method of claim 15, further comprising forming a pair of fifth scattering regions occupying respective distal edge regions of the grating coupler, the pair of fifth scattering regions comprising a fifth plurality of scatterer structures dimensioned to provide a fifth scattering strength stronger than the third scattering strength and a positive PDW.

17. The method of claim 15, wherein a scattering region of the plurality of scattering regions comprises a plurality of scatterer structures that vary in aspect ratio continuously from a proximal edge to a distal edge of the scattering region.

18. The method of claim 15, wherein scattering strength presented to incoming light by the plurality of scattering regions changes from weak to strong along a beam path of the incoming light to match a Gaussian mode profile of the optical fiber.

19. The method of claim 15, wherein shapes and aspect ratios of the scatterer structures are selected to modulate scattering along the beam path to match a gaussian mode of the fiber and reduce loss.

20. The method of claim 15, wherein the first plurality of scatterer structures in the pair of first scattering regions are configured as merged scatterer cells presenting an elongate structure parallel to the beam path.

* * * * *